United States Patent [19]

Fukuyama

[11] Patent Number: 4,706,002
[45] Date of Patent: Nov. 10, 1987

[54] NUMERICAL CONTROL UNIT
[75] Inventor: Hiroomi Fukuyama, Hachioji, Japan
[73] Assignee: Fanuc Ltd., Minamitsuru, Japan
[21] Appl. No.: 862,200
[22] PCT Filed: Aug. 24, 1982
[86] PCT No.: PCT/JP82/00332
  § 371 Date: Apr. 21, 1983
  § 102(e) Date: Apr. 21, 1983
[87] PCT Pub. No.: WO83/00754
  PCT Pub. Date: Mar. 3, 1983

Related U.S. Application Data

[63] Continuation of Ser. No. 491,200, Apr. 21, 1983, abandoned.

[30] Foreign Application Priority Data

Aug. 24, 1981 [JP] Japan .................................. 56-132434

[51] Int. Cl.$^4$ ............................................ G05B 19/10
[52] U.S. Cl. ................................... 318/568; 364/192;
      364/193; 364/134; 318/569
[58] Field of Search ............... 318/567, 568, 561, 569;
      364/167, 513, 180, 191, 192, 193, 131, 134, 133,
      704

[56] References Cited

U.S. PATENT DOCUMENTS

| | | | |
|---|---|---|---|
| 3,555,252 | 1/1971 | Garden | 318/561 X |
| 3,857,025 | 12/1974 | English | 318/568 X |
| 4,150,427 | 4/1979 | Slawson | 318/568 X |
| 4,281,379 | 7/1981 | Austin | 364/102 |
| 4,338,672 | 7/1982 | Perzley | 318/568 X |
| 4,348,623 | 9/1982 | Kobayashi | 318/568 |
| 4,379,335 | 4/1983 | Kirsh | 318/568 X |
| 4,415,965 | 11/1983 | Imazeki | 364/167 X |
| 4,481,591 | 11/1984 | Spongh | 318/568 X |

OTHER PUBLICATIONS

International Application 8 203 933.

Primary Examiner—William M. Shoop, Jr.
Assistant Examiner—Patrick C. Keane
Attorney, Agent, or Firm—Staas & Halsey

[57] ABSTRACT

A numerical control unit includes a program creating device (TPC) having an input device (104) for entering data for the creation of a machining program. A processor (101) creates a machining program in accordance with the entered data, and a memory (103) stores the created machining program. The numerical control unit also includes a machine control device (NCC) having a memory (203) for storing a machining program transferred from the memory (103), and a processor (201) which executes the machining program stored in the memory (203) to numerically control a connected industrial machine (MAC). By using this numerical control unit creation of a machining program and control of the machine may be carried out concurrently. The numerical control unit also includes a switching circuit (301) for selectively connecting an external unit (IOC) to the program creating device (TPC) or to the machine control device (NCC), thereby making it possible to preserve a machining program in the external unit (IOC).

7 Claims, 16 Drawing Figures

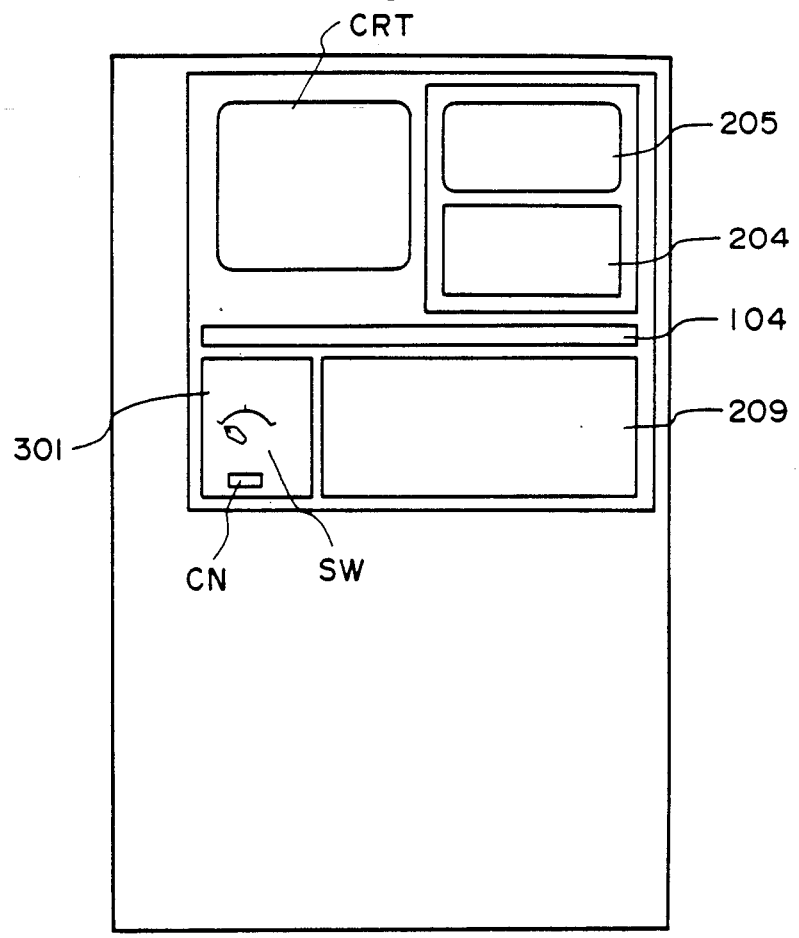
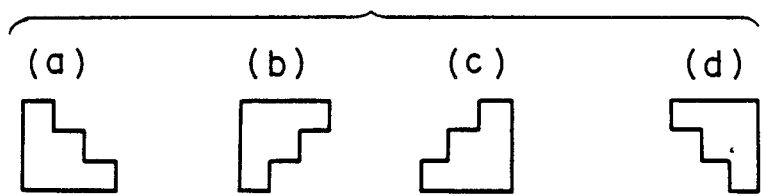

(a)

| $P_1$ | 0 | , | 0 |
|---|---|---|---|
| $P_2$ | $+K$ | , | 0 |
| $P_3$ | $+K$ | , | $-K'$ |
| $P_4$ | $+2K$ | , | $-K'$ |
| $P_5$ | $+2K$ | , | $-2K'$ |
| $P_6$ | $+3K$ | , | $-2K'$ |
| $P_7$ | $+3K$ | , | $-3K'$ |
| $P_8$ | 0 | , | $-3K'$ |

$\Rightarrow$

(b)

| $P_1$ | $X_1$ | , | $Z_1$ |
|---|---|---|---|
| $P_2$ | $X_1+K$ | , | $Z_1$ |
| $P_3$ | $X_1+K$ | , | $Z_1-K'$ |
| $P_4$ | $X_1+2K$ | , | $Z_1-K'$ |
| $P_5$ | $X_1+2K$ | , | $Z_1-2K'$ |
| $P_6$ | $X_1+3K$ | , | $Z_1-2K'$ |
| $P_7$ | $X_1+3K$ | , | $Z_1-3K'$ |
| $P_8$ | $X_1$ | , | $Z_1-3K'$ |

(c)

| $X_1$ | , | $Z_1$ |
|---|---|---|
| $X_2$ | , | $Z_2$ |
| $X_3$ | , | $Z_3$ |
| $X_4$ | , | $Z_4$ |
| $X_5$ | , | $Z_5$ |
| $X_6$ | , | $Z_6$ |
| $X_7$ | , | $Z_7$ |
| $X_8$ | , | $Z_8$ |

NUMERICAL CONTROL UNIT

This is a continuation of co-pending application Ser. No. 491,200 filed in Apr. 21, 1983, now abandoned.

BACKGROUND OF THE INVENTION

This invention relates to a numerical control unit for numerically controlling an industrial machine and, more particularly, to a programmable numerical control unit which is capable of on-site creation and entry of a machining program.

Generally, a numerical control unit (referred to as a NC unit) of the kind that finds wide use in the art is adapted to create an NC tape containing a machining program, and to read the tape by means of a tape reader mounted on the NC unit to enter the machining program. NC units also include so-called manual NC units which are simple in construction and make no use whatsoever of a tape reader. In a manual NC unit, positioning or cutting data is preset on a number of dials mounted on the panel of the NC unit which, subsequently, reads the positioning or cutting data from the dials in successive fashion to execute numerical control processing. Alternatively, numerical data may be entered successively from an MDI (manual data input device) and stored in memory, after which the NC unit reads out the numerical data successively to perform numerical control processing. Thus, a manual NC unit is characterized in that (1) direct programming is performed at the job site while the programmer observes his machining drawing, (2) the program data is entered by means of the dials or MDI, and (3) the machine tool is made to perform an actual machining operation based on this data.

In such conventional manual NC units, however, programming is extremely difficult, machining efficiency is poor because of the considerable time required for programming, and input errors are common. Though manual NC units have been proposed which enable easy programming from machining drawings in a shorter period of time and with fewer errors, these proposed manual NC units are not always fully effective in shortening the time required for programming, even though the time required is less than in the prior art. In addition, control of machining performed by a machine tool cannot be carried out while programming is in progress. A serious disadvantage even with these proposed manual NC units, therefore, is that machining efficiency is poor.

Furthermore, since a manual NC unit does not, by nature, possess such data input/output equipment as a tape reader/puncher and bubble memory cassette there is no way to preserve for possible future use a machining program created through painstaking effort, and no way to enter NC program data from an external storage medium. Thus, an NC unit of this type is inefficient since NC data must be created with each use, even though the identical machining operation may be performed at some future date.

SUMMARY OF THE INVENTION

Accordingly, an object of the present invention is to provide a manual NC unit which enables a machine tool to be controlled even while programming is in progress.

Another object of the present invention is to provide a manual NC unit with which a machining program can be preserved and entered.

Still another object of the present invention is to provide an inexpensive manual NC unit which, instead of being specially equipped with an input/output unit, merely includes a connector for connection to an external input/output unit.

A further object of the present invention is to provide a manual NC unit, wherein data can be exchanged among a machining program creation side, a machining control side and an external input/output unit, wherein a created machining program or a machining program that has just been used to complete contrl of a machining operation can be preserved in an external storage medium as required, and wherein the preserved machining program can be applied as an input to the machining control side.

According to the present invention, a numerical control unit is provided with a program creating device having input means for entering data for the creation of a machining program, a first processor for creating a machining program in accordance with the entered data, and a first memory for storing the created machining program, and with a machine control device having a second memory for storing a machining program transferred from the first memory, and a processor for executing the machining program stored in the second memory to numerically control a connected industrial machine, whereby creation of a machining program and control of the machine may be carried out concurrently. The numerical control unit is also provided with a switching circuit for selectively connecting an external unit to the program creating device or to the machine control device, thereby making it possible to preserve a machining program in the external unit.

With the present invention, program creation processing and numerical control processing can take place concurrently, thereby raising operating efficiency. Furthermore, once a machining program has been created, the program can be preserved in an external unit to enable its reuse. Accordingly, the same program need not be recreated through use of the numerical control unit, thereby resulting in greatly improved operating efficiency. Moreover, since a machining program can be preserved and reused without incorporating the external unit within the numerical control unit, the apparatus can be provided at low cost.

BRIEF DESCRIPTION OF THE DRAWINGS

FIG. 2 is a front view of the exterior of a manual NC unit according to the present invention;

FIGS. 4a-d and 5 are diagrams of various contour patterns useful in describing programming according to the present invention;

FIGS. 8a-c are charts used for describing the content of a memory according to the present invention;

DESCRIPTION OF THE PREFERRED EMBODIMENTS

Figure 1:
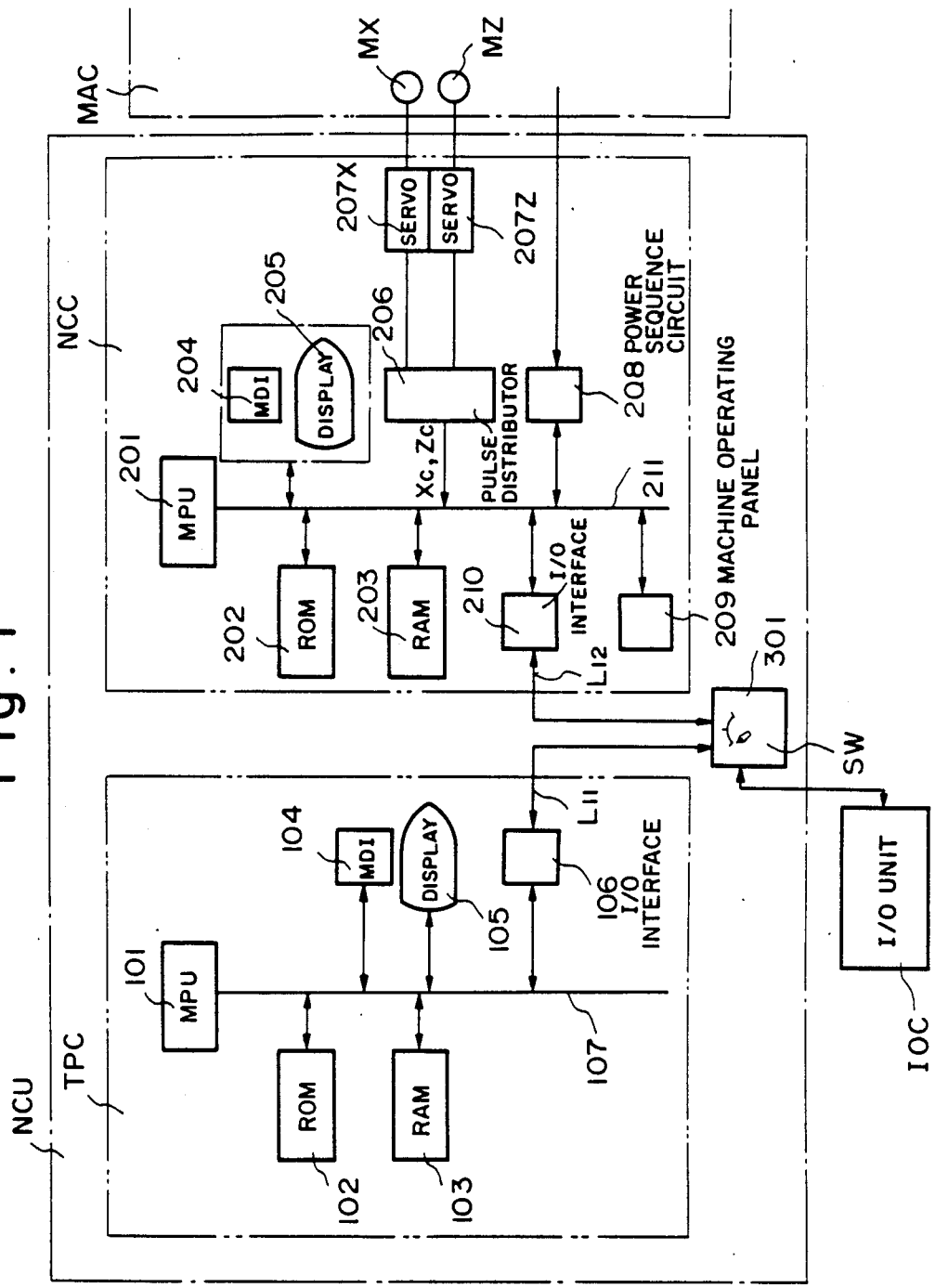
FIG. 1 is a block diagram of the NC unit of the present invention.
Figure 3:
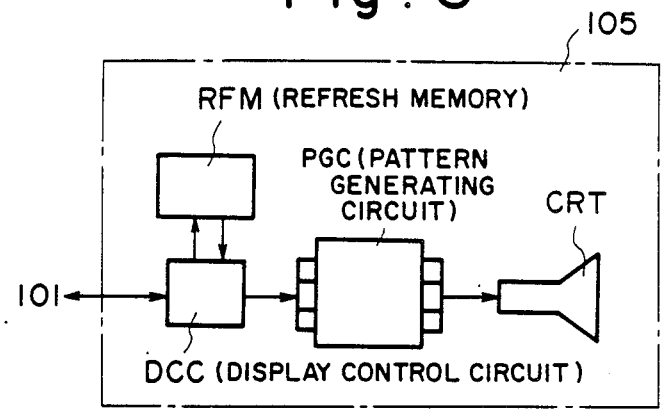
FIG. 3 is a block diagram of the graphic display unit 105 in FIG. 1.

An embodiment of the present invention will now be described in detail with reference to the drawings. FIG. 1 is a block diagram of a manual NC unit according to the present invention, and FIG. 2 is a front view of the exterior of the manual NC unit. In the Figures, NCU represents a numerical control unit, TPC a machining program creating device, NCC a machining control device, IOC an input/output unit such as a paper tape reader/puncher or bubble cassette memory control device, and MAC a machine tool. The machining program creating device TPC includes a microprocessor 101 which executes processing for, e.g., the creation of the machining program, a read-only memory (ROM) 102 which stores a control program for creating an NC tape and for editing display data, a rewritable memory (RAM) 103 for storing the created machining program, a keyboard (or MDI) 104 for entering data, a graphic display device 105 for displaying a contour pattern based on the data entered by the keyboard, or for displaying a machining path based on the created machining program, an input/output interface 106 for administering an exchange of data between the machining control device NCC and the input/output unit IOC, and a data/address bus 107 for interconnecting the foregoing elements. The keyboard 104 is provided with a variety of keys. For example, these include pattern input keys for entering desired contour patterns (patterns whose shapes have been defined but whose dimensions have not), step number keys of entering the number of steps possessed by a step-like contour pattern, alpha-numeric keys for entering dimensions or present position and pattern modification information, a transmit key for transmitting the input data to the microprocessor (referred to simply as a processor) 101, and a test key for displaying the machining path of a tool on the display device 105, based on the created machining program. The keyboard 104 additionally incorporates a buffer register for storing the data entered by the keying operation, which data is sent to the processor 101 by depressing the transmit key. As shown in FIG. 3, the graphic display unit 105 includes a display control circuit DCC, a cathode ray tube CRT, a refresh memory RFM for storing display data sent by the processor 101, and a pattern generating circuit PGC for generating graphics and characters on the basis of the display data read out of the refresh memory RFM continuously via the display control circuit DCC.

The machining control device NCC includes a microprocessor (hereinafter referred to as a processor) 201 for controlling machining on the basis of the machining program and control program, a read-only memory (ROM) 202 for storing the control program, a rewritable memory (RAM) 203 for storing the machining program delivered by the machining program creating device TPC, an MDI device 204 for entering one block of numerical control data and for entering program correction data, a display device 205, a pulse distributor 206 for executing well-known pulse distribution computations upon receiving position commands Xc, Zc and a feed rate F00 applied thereto as input signals, X- and, Z-axis servo control circuits 207X, 207Z for driving and controlling motors MX, MZ of the machine tool MAC. A power sequence circuit 208 receives M, S and T function instructions read from the machining program, and is adapted to send these as commands to the machine MAC. The power sequence circuit 208 also delivers, e.g., relay contact signals and limit signals from the machine MAC to the processor 201. The machining control device also includes a machine operating panel 209, an input/output interfaces 210 for administering an exchange of data between the machining program creating device TPC and the input/output unit IOC, and an address/data bus 211 for interconnecting the foregoing elements. It should be noted that the machining control device NCC has substantially the same construction as that of an ordinary computerized NC device.

A switching device 301 is disposed between the machining tape creating device TPC and the machining control device NCC. The switching device 301 has a switching circuit and a changeover switch SW. By operating the changeover switch, connections can be established among the machining program creating device TPC, machining control device NCC and input-/output unit IOC, as desired.

As shown in the front view of FIG. 2 illustrating the exterior of an NC unit according to the present invention, the front side of the unit is provided with e.g., the screen of the display device 205 belonging to the machining control device NCC, the panel of the MDI device 204, the CRT of the machining program creating device TPC, and the keyboard 104, etc. Also provided are the machine operating panel 209 of the machining control device NCC, the changeover switch SW of the switching circuit 301, and a connector CN. In FIG. 2, the connector (receptacle) CN is for receiving a plug connected to the input/output unit IOC; inserting the plug establishes a connection between the switching device 301 and the input/output unit IOC. In the illustration, the changeover switch SW and connector CN are not provided on the machine operating panel 209. These can be provided on the machine operating panel if desired, however, or at any other suitable location.

Thus, since there are provided a display screen and input unit for the machining control device NCC and a display screen and input unit for the machining program creating device TPC, it is possible to easily verify the operation of the machining control device and apply commands thereto even while a machining program is being created.

The operaton of the present invention will be described next.

[A] Described first will be processing for creating a machining program, in which we will assume that the program is for a turning operation performed by a lathe.

First, assuming that the contour patterns which can be entered by the keyboard 104 are as shown by (a) through (d) in FIG. 4, four input pattern keys will be arrayed on the keyboard 104, each key corresponding to one of these patterns. It should be noted that an arrangement can be adopted wherein patterns are selected by operating numeric keys. In entering the numerical data for the machining contour illustrated in FIG. 5, therefore, the first step is to depress the pattern input key corresponding to the contour pattern, then enter the step number "3" and depress the transmit key. This feeds the contour pattern information and step number information into the processor 101 through the bus line 107.

Figure 6:
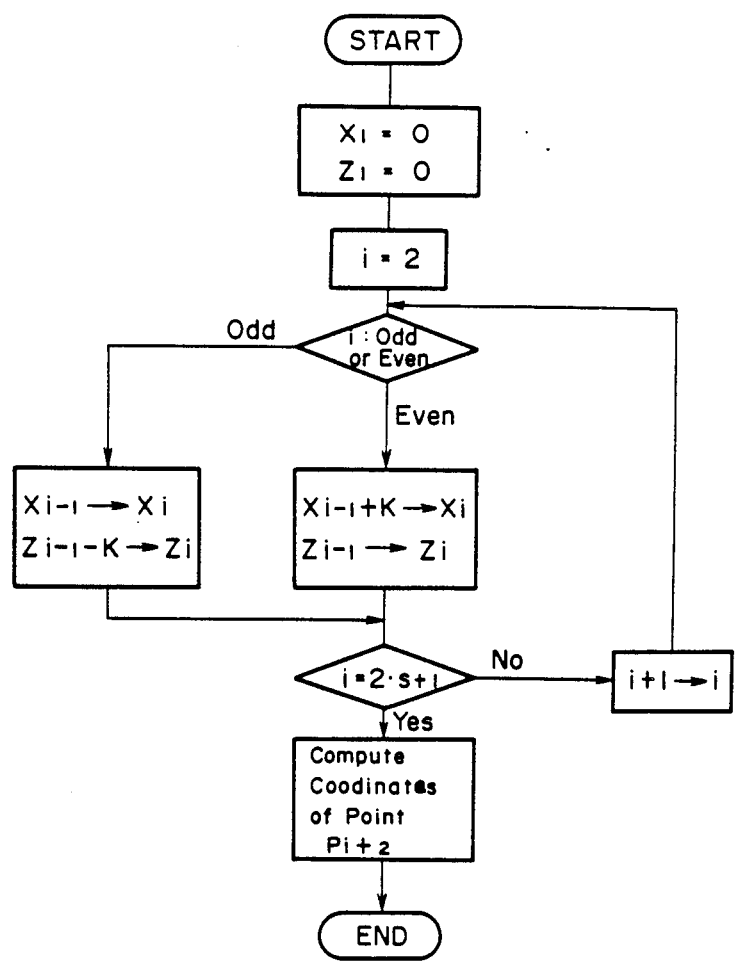
FIG. 6 is a flowchart of display data editing processing according to the present invention.

Upon receiving the input contour pattern and step number information, the processor 101 executes processing for the purpose of editing display data, in accordance with the flowchart shown in FIG. 6.

Figure 5:
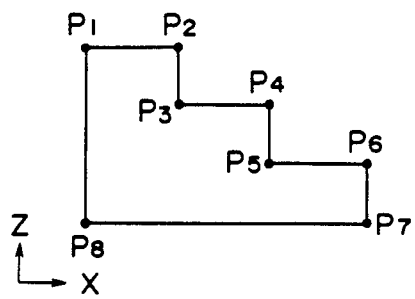

Specifically, letting P1, P2 ... designate the corners (points) on the contour pattern shown in FIG. 5, the coordinate values for each point Pi ($i = 1, 2 \ldots$) are defined, display data is edited on the basis of these coordinate values, and the edited display data is delivered to the graphic display device 105. This editing processing will be described hereinafter with reference to FIG. 7.

First, the starting point (point P1) is taken as the origin. Thus, let $X1 = Z1 = 0$. Next, the coordinates (Xi, Zi) of points Pi ($i = 1, 2 \ldots$) are found. For point P2, by way of example, the following operations are performed:

$$X1 + K \rightarrow X2, \quad Z1 \rightarrow Z2$$

to obtain (X2, Z2). Thereafter a decision is made as to whether i is equal to $(2S + 1)$ (where S is the number of steps, e.g., $S = 3$ in the example of FIG. 5). If they are unequal, then the operation $i + 1 \rightarrow i$ is performed, and the coordinates (X3, Z3) of point P3 are found by performing the operations:

$$X2 \rightarrow X3, \quad Z1 - K' \rightarrow Z3$$

These arithmetic operations are repeated in like fashion until $i = 2S + 1 (=7)$ is established. When $i = 7$ holds, the coordinates (X8, Z8) of point P8 are found from:

$$X1 \rightarrow X8, \quad -S \cdot K' \rightarrow Z8$$

The foregoing completes the processing for defining the coordinate values of each of the points Pi. It should be noted that K, K' are predetermined values.

Next, the processor 101 utilizes these coordinate values to edit the display data. The display data is composed of the following, which serves as an example:

| "Point \|0,0\| (blank)" | data for positioning beam at origin |
| --- | --- |
| "Vector \|K,0\| (solid line)" | display data for line segment ① |
| "Vector \|0,K'\| (solid line)" | display data for line segment ② |
| "Vector \|K,0\| (solid line)" | display data for line segment ③ |
| "Vector \|0,3K'\| (solid line)" | display data for line segment ⑧ |

Figure 7:
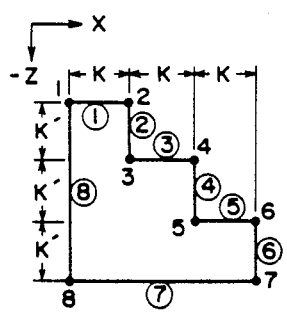
FIG. 7 is a diagram of a contour pattern displayed on a CRT according to the present invention.

After this editing operation, the display data is sent to the graphic display device 105. In other words, the display data is stored in the refresh memory RFM via the display control circuit DCC (FIG. 3). The display control circuit DCC then continuously and repeatedly reads the display data out of the refresh memory RFM and feeds it into the pattern generator PGC. The latter generates a pattern based on the display data and causes it to be displayed on the cathode-ray tube CRT. FIG. 7 shows the contour pattern displayed on the CRT as a result of the foregoing processing.

When the desired contour pattern appears on the CRT, the operater then enters the actual positional coordinates to each of the points Pi or the actual dimensions of the contour, while he observes both the displayed graphic and his machining drawings. It should be noted that each corner of the contour pattern displayed on the CRT is accompanied by a displayed number (e.g., a letter of the alphabet) 1, 2, ..., 7 for specifying the corresponding corner.

Figures 8, 9:
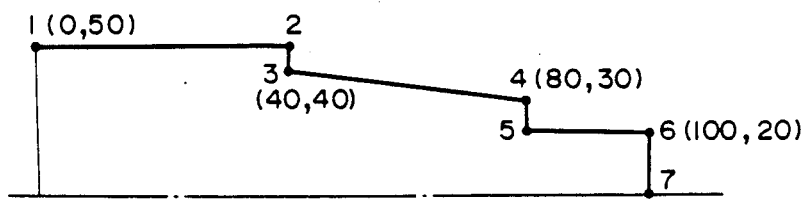
FIG. 9 is a diagram of a final contour displayed on the CRT according to the present invention.

When the above processing for editing the display data is completed, the provisional coordinate values are stored in the memory 103, in the manner shown in FIG. 8(a). If the alphanumeric keys on the keyboard 104 are operated under these conditions to enter the following:

$$|X_1, Z_1|$$

then the coordinates of each corner will be recomputed, and the contents of memory 103 will be converted to the form shown in FIG. 8(b). Thenceforth, if the operator likewise enters the positional coordinates of the prescribed corners, then the coordinates of all the corners may be found, and the content of the data memory will have the form shown in FIG. 8(c). For example, if the operator actually enters the coordinates:

| 1 | 0., 50. |
| --- | --- |
| 3 | 40., 40. |
| 4 | 80., 30. |
| 6 | 100., 20. | for the positions occupied by the corners 1, 3, 4 and 6, the final contour will be defined as shown in FIG. 9. It is noteworthy that the final contour can be defined even without necessarily entering the positional coordinates of corners 2, 5. In other words, only minimal numerical data, such as positional coordinates and dimensions, need be entered to define graphics, and the input sequence can be a random one.

The microprocessor 101 edits the display data in the above manner each time one item of numerical data is entered, and causes the display data to be delivered to the graphic display device 105 for display on the CRT. Thus, the graphic which appears on the CRT of the graphic display device 105 successively changes in shape on the basis of each item of numerical data that is entered. The displayed graphic is the optimum one in the sense that the contour does not extend beyond the edges of the CRT display, without at the same time appearing too small.

Since the graphic displayed on the basis of the numerical data changes immediately after each item of numerical data is entered, the operator can determine visually whether each data item is correct. Further, the displayed graphic is gradually modified into the final contour, enabling the operator to visually confirm the transition to the final contour. This enables the creation of sophisticated numerical control information with little possibility of error.

Thus, the numerical data, such as the positional coordinates or dimensions specifying the final contour, is entered through the foregoing operation. This is followed by entering, e.g., the starting and end points of the tool, the distance and direction $\pm \Delta u$ for the finishing allowance along the X-direction, the distance and direction $\pm \Delta w$ for the finishing allowance along the Z direction, feed speed (F00), spindle rotational frequency (S00), and cut width $\Delta d$. The entry of these items of data completes the input operation of all numerical control data for turning work performed by the lathe.

Figure 10:
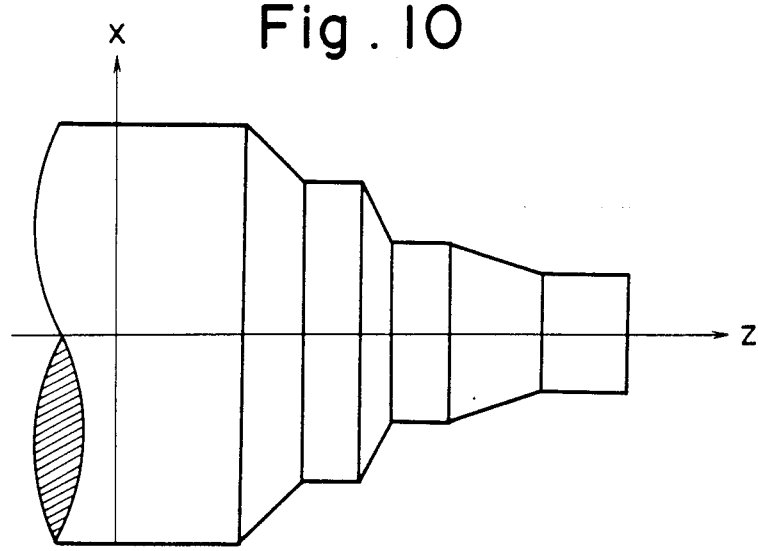
FIGS. 10 and 11 are diagrams used to describe processing for creation of a machining program according to the present invention.

When entry of all numerical control data is completed, the processor 101, under the control of the control program for creating a machining program, utilizes these items of numerical control data to create the machining program. For example, the processor 101 will create the following machining program when the final contour is as shown in FIG. 10, where $\Delta u = 4.0$, $\Delta w = 2.0$, and $\Delta d = 7.0$, and where feed speed and spindle rotational frequency for an outer diameter rough cutting cycle are F30, S55, and feed speed and spindle rotational frequency for a finishing cycle are F15, S58:

| NO10 | G50X200.0 Z220.0; |
| NO11 | G00X160.0 Z180.0; |
| NO12 | G71 P013 Q019 U4.0 W2.0 D7.000 F30 S55; |
| NO13 | G00X80.0 F15 S58; |
| NO14 | G01W-40.0; |
| NO15 | X120.0 W-30.0; |
| NO16 | W-20.0; |
| NO17 | X2000.0 W-10.0; |
| NO18 | W-20.0; |
| NO19 | X280.0 W-20.0; |
| NO20 | G70 P013 Q019 |

It should be noted that the above program is constituted by diameter specifications. In the machining program, Ni (i=010 to 020) denotes the sequence number, G50 denotes a G-function instruction for setting the coordinate system, G00, G01, G71 and G70 denote M-function instructions for positioning, linear interpolation, outer diameter rough cutting cycle and finishing cycle, respectively, X and Z designate absolute commands, and U, W incremental commands. Further, block NO10 signifies the coordinate values of the tool starting point, and block NO11 the coordinate values of the end point thereof. Block NO12 indicates an instruction for rough cutting, at a cutting width 7.0, the contour specified by the blocks at sequence numbers NO13 to NO19. Blocks NO13 to NO19 indicate the final machining shape, and block NO 20 an instruction for the finishing machining of the shaped specified by blocks NO13 to NO19.

Figure 11:
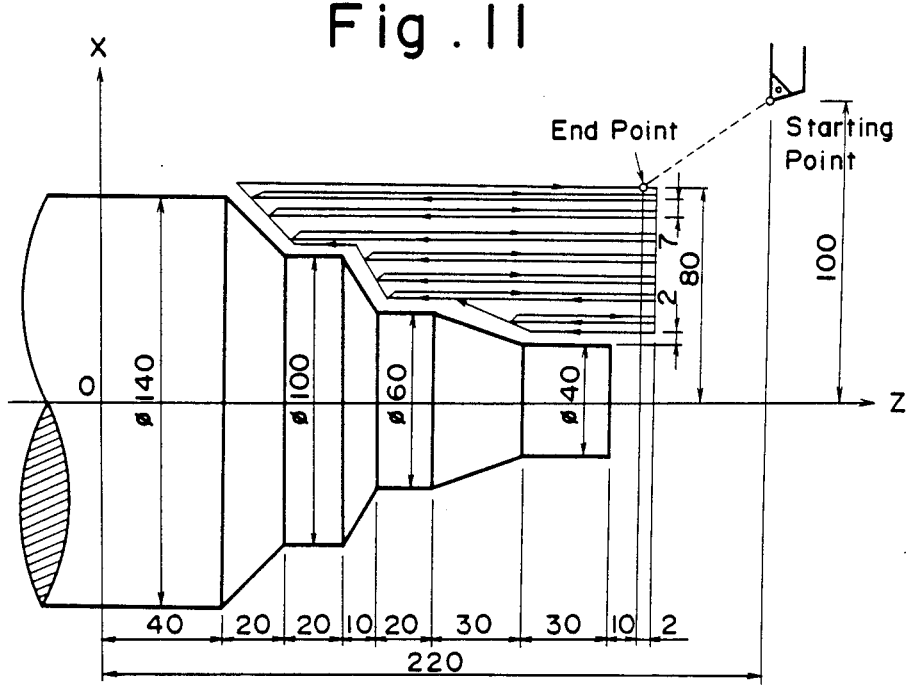

When the above-described machining program has been created in accordance with the foregoing sequence, a program number is attached to the machining program and the program is stored in memory 103 (FIG. 3) to end the processing for cration of the machining program. When the test key on the keyboard is depressed, the machining program data will be read successively, causing the tool path, shown in FIG. 11, to be displayed on the CRT of the graphic display device 105.

[B] Processing for transferring machining program to machining control device NCC The changeover switch SW is operated to interconnect the machining program creating device TPC and machining control device NCC so that an exchange of information between them is made possible through the input/output interface 106, line L11, switching device 301, line L12 and input/output interface 210. When the machining program has been created according to the sequence described in [A], the processor 101 begins the processing for the transfer of the machining program in response to a transfer request, or by sensing that the machining control device NCC is not in the process of controlling machining. Specifically, the machining program data is fed successively from the memory 103 into the buffer register (not shown) of the input/output interface 106. As a result, an input/output control unit (not shown), located within the input/output interface 106, transfers the machining program data, in the form of a bit serial or in parallel, to a buffer register (not shown) in the input/output interface 210 through the transmission line L11, switching device 301 and transmission line L12. The processor 201 of the machining control device NCC, meanwhile, reads the transferred machining program data and loads it in memory 203.

Thenceforth the processors 101, 201 continue to store the machining program data successively in the memory 203, from the memory 103, through input/output interface 106, transmission line L11, switching device 301, transmission line L12 and input/output interface 210, just as described above, until the machining program is stored in its entirety in the memory 203, thereby ending processing for data transfer to the memory 203.

[C] Processing for machining control

When the machining program has been stored in memory 203, the machining control device NCC is placed in a mode which enables ordinary numerical control processing (machining control) to be performed. When a cycle start button on the operation panel 209 is depressed, the processor 201 reads the machining program data successively from the memory 203 and, under the control of the control program, executes the outer diameter rough cutting and finishing cycles.

[D] Processing for concurrent machining program creation and machining control

In the present invention, as will be apparent from the arrangement shown in FIG. 1, separate items of hardware are provided; namely, the hardware (the machining program creation device TPC) exclusively for creating the machining program and the hardware (machining control device NCC) exclusively for controlling machining. These items of hardware are capable of executing processing independently of each other. Therefore, whenever necessary, a created machining program may be transferred from the memory of the machining program creation device TPC to the memory of the machining control device NCC, machining control may be performed based on the machining program and, concurrently, processing for creating a machining program may be executed by the machining program creation device TPC.

[E] Processing for preservation and read-out of machining program

When the machining program is to be preserved in an external storage medium or read out of the external storage medium through the input/output unit IOC, a connecting plug, with which the input/output unit is equipped, is plugged into the connector CN (FIG. 2) of the NC unit, and the changeover switch SW of the switching device 301 is operated to connect the machining program creating device TPC or the machining control device NCC to the input/output unit IOC. Then, when the input/output unit IOC issues a machining program request signal, either microprocessor 101 or microprocessor 201 reads the signal and responds by transferring the machining program stored in memory 103 or memory 203 to the input/output unit IOC, from which the program is stored in the external storage medium for preservation. When the input/output unit IOC issues a machining program transmission signal, the signal is read by either microprocessor 101 or microprocessor 201. As a result, a machining program stored in the external storage medium is subsequently delivered to either the machining program creating device TPC or the machining control device NCC where it is stored in memory 103 or memory 203. It should be noted that a transfer of data with the input/output unit IOC may also be executed by arranging the NC unit NCU to generate the machining program transmission or request signal.

According to the present invention as described hereinabove, the creation of a program and the control of machining based on a separate, already created program can be executed in parallel. In addition, during the control of machining, it is possible to create the machining program that will be required next. It is therefore unnecessary to wait for the creation of a machining program, enabling machining efficiency to be vastly improved. Furthermore, according to the invention, a machining program can be preserved and read, without the incorporation of a costly input/output unit, merely by providing a connector and connecting an external input/output unit thereto. This makes it possible to greatly enhance the operating efficiency of a manual NC unit.

Thus, with the present invention, programming can be carried out even while a machine is being controlled, and an already created machining program can be stored in an external storage medium with facility. The invention consequently raises the operating efficiency of the numerical control unit and contributes to preservation of machining programs. The present invention therefore is suitable for application in the field of numerical control.

What is claimed is:

1. A manual numerical control unit operatively connected to an industrial machine and operatively connectable to an external unit for storing a machining program, comprising:
   a program creating device including:
      input means for entering data for the creation of a machining program;
      a first processor, operatively connected to said input means, for creating a machining program in accordance with the entered data; and
      a first memory, operatively connected to said first processor, for storing the created machining program;
   a machine control device including:
      a second memory, operatively connectable to said first memory, for storing a machining program transferred from said first memory; and
      a second processor, operatively connected to said second memory, for executing the machining program stored in said second memory to numerically control the industrial machine; and
   a switching circuit, operatively connected to said program creating device and said machine control device, and having a connector for coupling to the external unit, for selectively coupling the external unit to said program creating device or to said machine control device, and for selectively connecting said first and second memories to transfer the machining program from said program creating device to said machine control device, said switching circuit being disconnected when said program creating device is to perform machining program creation concurrently with said machine control device numerically controlling the industrial machine.

2. A manual numerical control unit according to claim 1, wherein said switching circuit is adapted to selectively interconnect said program creating device and said machine control device.

3. A manual numerical control unit according to claim 2, wherein the external unit is a storage unit, and wherein data is sent and received between the external unit and said first memory of said program creating device or said second memory of said machine control device in dependence upon the state of said switching circuit.

4. A manual numerical control unit according to claim 1, wherein the external unit is a storage unit, and wherein data is sent and received between the external unit and said first memory of said program creating device or said second memory of said machine control device in dependence upon the state of said switching circuit.

5. A manual numerical control unit according to claim 2, wherein the external unit is a storage unit, and wherein data is sent and received between the external unit and said first memory of said program creating device or said second memory of said machine control device in dependence upon the state of said switching circuit.

6. A manual numerical control unit operatively connectable to an industrial machine and an external unit for storing a machining program, comprising:
   a machine program creating device for creating a machining program, including:
      first means for entering data for the creation of the machining program;
      second means, operatively connected to said first means, for creating the machining program in accordance with the entered data; and
      third means, operatively connected to said second means, for storing the created machining program;
   a machine control device including:
      fourth means for storing a completed machining program; and
      fifth means, operatively connected to said fourth means, for executing the completed machining program stored in said fourth means to numerically control the industrial machine; and
   a switching circuit, operatively connected to said third means and said fourth means, and having a connector for coupling to the external unit, for selectively connecting said third means, said fourth means and the external unit, said switching circuit having a first state in which said third means is operatively connected to said fourth means to transfer the created machining program from said third means to said fourth means for storage as the completed machining program, said switching circuit having a second state in which the external unit is operatively connected to said third means, said switching circuit having a third state in which the external unit is operatively connected to said fourth means, said switching circuit having a fourth state in which the third and fourth means are disconnected from each other and disconnected from the external unit, so that when said switching circuit is in the fourth state said program creating device performs machining program creation concurrently with said machine control device numerically controlling the industrial machine.

7. A numerical control unit according to claim 6, wherein the external unit is a storage unit, wherein the storage unit is capable of storing the created machine programs stored in said third means when said switching circuit is in the second state, and wherein the storage unit is capable of transmitting data to said fourth means or receiving the completed machining program from said fourth means when said switching circuit is in the third state.

* * * * *